US008401316B2

(12) United States Patent
Babacan et al.

(10) Patent No.: US 8,401,316 B2
(45) Date of Patent: Mar. 19, 2013

(54) METHOD AND APPARATUS FOR BLOCK-BASED COMPRESSION OF LIGHT-FIELD IMAGES

(75) Inventors: Sevket Derin Babacan, Evanston, IL (US); Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/429,226

(22) Filed: Mar. 23, 2012

(65) Prior Publication Data

US 2012/0183232 A1  Jul. 19, 2012

Related U.S. Application Data

(63) Continuation of application No. 12/111,735, filed on Apr. 29, 2008, now Pat. No. 8,155,456.

(51) Int. Cl.
  *G06K 9/36* (2006.01)
  *G06K 9/46* (2006.01)
  *G06T 15/50* (2011.01)

(52) U.S. Cl. ........................................ 382/232; 345/426
(58) Field of Classification Search .................. None
   See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,985,419 A | 10/1976 | Matsumoto et al. | |
| 4,180,313 A | 12/1979 | Inuiya | |
| 4,193,093 A | 3/1980 | St. Clair | |
| 4,230,942 A | 10/1980 | Stauffer | |
| 4,580,219 A | 4/1986 | Pelc et al. | |
| 4,732,453 A | 3/1988 | de montebello et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,729,011 A | 3/1998 | Sekiguchi | |
| 5,946,077 A | 8/1999 | Nemirovskiy | |

(Continued)

FOREIGN PATENT DOCUMENTS

| | | |
|---|---|---|
| EP | 1548481 | 6/2005 |
| WO | 01/37025 | 5/2001 |

(Continued)

OTHER PUBLICATIONS

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

(Continued)

*Primary Examiner* — Li Liu
(74) *Attorney, Agent, or Firm* — Wolfe-SBMC

(57) ABSTRACT

A method and apparatus for the block-based compression of light-field images. Light-field images may be preprocessed by a preprocessing module into a format that is compatible with the blocking scheme of a block-based compression technique, for example JPEG. The compression technique is then used to compress the preprocessed light-field images. The light-field preprocessing module reshapes the angular data in a captured light-field image into shapes compatible with the blocking scheme of the compression technique so that blocking artifacts of block-based compression are not introduced in the final compressed image. Embodiments may produce compressed 2D images for which no specific light-field image viewer is needed to preview the full light-field image. Full light-field information is contained in one compressed 2D image.

20 Claims, 11 Drawing Sheets

U.S. PATENT DOCUMENTS

| | | | |
|---|---|---|---|
| 6,097,394 | A | 8/2000 | Levoy et al. |
| 6,097,541 | A | 8/2000 | Davies et al. |
| 6,137,535 | A | 10/2000 | Meyers |
| 6,137,937 | A | 10/2000 | Okano et al. |
| 6,268,846 | B1 | 7/2001 | Georgiev |
| 6,301,416 | B1 | 10/2001 | Okano et al. |
| 6,339,506 | B1 | 1/2002 | Wakelin et al. |
| 6,351,269 | B1 | 2/2002 | Georgiev |
| 6,476,805 | B1 | 11/2002 | Shum et al. |
| 6,738,533 | B1 | 5/2004 | Shum et al. |
| 6,838,650 | B1 | 1/2005 | Toh |
| 7,019,671 | B2 | 3/2006 | Kawai |
| 7,054,067 | B2 | 5/2006 | Okano et al. |
| 7,085,062 | B2 | 8/2006 | Hauschild |
| 7,620,309 | B2 | 11/2009 | Georgiev |
| 7,723,662 | B2 | 5/2010 | Levoy et al. |
| 7,732,744 | B2 | 6/2010 | Utagawa |
| 7,792,423 | B2 | 9/2010 | Raskar et al. |
| 7,880,794 | B2 | 2/2011 | Yamagata et al. |
| 7,962,033 | B2 | 6/2011 | Georgiev et al. |
| 7,965,936 | B2 | 6/2011 | Raskar et al. |
| 8,019,215 | B2 | 9/2011 | Georgiev et al. |
| 8,126,323 | B2 | 2/2012 | Georgiev et al. |
| 2001/0012149 | A1 | 8/2001 | Lin et al. |
| 2001/0050813 | A1 | 12/2001 | Allio |
| 2002/0140835 | A1 | 10/2002 | Silverstein |
| 2003/0231255 | A1 | 12/2003 | Szajewski et al. |
| 2004/0114807 | A1 | 6/2004 | Lelescu et al. |
| 2004/0223214 | A1 | 11/2004 | Atkinson |
| 2005/0088714 | A1 | 4/2005 | Kremen |
| 2005/0122418 | A1 | 6/2005 | Okita et al. |
| 2006/0104542 | A1 | 5/2006 | Blake et al. |
| 2007/0091197 | A1 | 4/2007 | Okayama et al. |
| 2007/0252074 | A1 | 11/2007 | Ng et al. |
| 2008/0056549 | A1 | 3/2008 | Hamill et al. |
| 2008/0107231 | A1 | 5/2008 | Miyazaki et al. |
| 2008/0152215 | A1 | 6/2008 | Horie et al. |
| 2008/0165270 | A1 | 7/2008 | Watanabe et al. |
| 2008/0166063 | A1 | 7/2008 | Zeng |
| 2008/0187305 | A1 | 8/2008 | Raskar et al. |
| 2008/0193026 | A1 | 8/2008 | Horie et al. |
| 2008/0218610 | A1 | 9/2008 | Chapman et al. |
| 2008/0247623 | A1 | 10/2008 | Delso et al. |
| 2009/0041381 | A1 | 2/2009 | Georgiev |
| 2009/0041448 | A1 | 2/2009 | Georgiev |
| 2009/0086304 | A1 | 4/2009 | Yurlov et al. |
| 2009/0140131 | A1 | 6/2009 | Utagawa |
| 2009/0185801 | A1 | 7/2009 | Georgiev et al. |
| 2009/0295829 | A1 | 12/2009 | Georgiev et al. |
| 2010/0026852 | A1 | 2/2010 | Ng et al. |
| 2010/0085468 | A1 | 4/2010 | Park et al. |
| 2010/0141802 | A1 | 6/2010 | Knight et al. |
| 2010/0205388 | A1 | 8/2010 | MacInnis |
| 2010/0265386 | A1 | 10/2010 | Raskar et al. |

FOREIGN PATENT DOCUMENTS

| | | |
|---|---|---|
| WO | 2006/057838 | 6/2006 |
| WO | 2007/115281 | 10/2007 |

OTHER PUBLICATIONS

Georgiev, et al. "Light-Field Capture by Multiplexing in the Frequency Domain," Adobe Technical Report, Apr. 2007, all pages.

Park, S., Park, M., and Kang, M., "Super-resolution image reconstruction: a technical overview," Signal Processing Magazine, 2003, 16 pages.

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, (Jan. 1, 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Georgiev T., Lumsdaine A.: Depth of field in plenoptic cameras. In Eurographics 2009—Annex (Apr. 2009), pp. 5-8.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

Levoy, Mark, "Optical Recipes for Light Microscopes," Stanford Computer Grpahics Laboratory Technical Memo 2006-001, Jun. 20, 2006, 10 pages.

Zhang, et al., "A Survey on Image-based Rendering-Representation, Sampling and Compression," Signal Processing, Image Communication, Elsevier Science Publishers, vol. 19, No. 1, Jan. 1, 2004.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001.

International Search Report for Application No. Patent No. 09159086.9-2202, mailed Aug. 14, 2009.

Chang, et al., "Light Field Compression Using Disparity-Compensated Lifting and Shape Adaptation," IEEE Transactions on Image Processing, vol. 15, No. 4, Apr. 2006.

Sebe, et al., "Mutli-View Geometry Estimation for Light Field Compression," VMV 2002.

Ng, et al., "Light Field Photography with a Hand-Held Plenoptic Camera," Stanford Tech Report CTSR Feb. 2005.

Levoy, et al., "Light Field Rendering," Proc. ACM SIGGRAPH, Jul. 1996.

Levoy, et al., "Light Field Microscopy," ACM Transactions on Graphics 25(3), Proc. SIGGRAPH 2006.

Adelson T., Wang J.: "Single Lens Stereo with a Plenoptic Camera," IEEE Transactions on Pattern Analysis and Machine Intelligence (1992), 99-106.

Brown M. Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Georgiev T., Wainer M.: "Morphing Between Multiple Images," Tech. Rep. (1997).

Isaksen A., McMillan L., Gortler S. J.: "Dynamically Reparameterized Light Fields," ACM Trans. Graph. (2000), 297-306.

Xiao J., Shah M.: "Tri-view Morphing," Computer Vision and Image Understanding 96,3 (2004), 345-366.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Ng R.: "Fourier Slice Photography," Proceedings of ACM SIGGRAPH 2005 (Jan. 2005).

Naemura T., Yoshida T., Harashima H.: "3d Computer Graphics Based on Integral Photography," Optics Express, vol. 8, 2 (2001).

Zitnick C. L., Jojic N., Kang S.: "Consistent Segmentation for Optical Flow Estimation" In Proceedings of IEEE International Conference on Computer Vision (ICCV) (2005).

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002).

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).

U.S. Appl. No. 12/574,183, filed Oct. 6, 2009.
U.S. Appl. No. 12/144,411, filed Jun. 23, 2008.
U.S. Appl. No. 12/186,396, filed Jun. 23, 2008.
U.S. Appl. No. 11/874,611, filed Oct. 18, 2007.
U.S. Appl. No. 11/627,141, filed Jan. 25, 2007.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/5503,803, filed Jul. 15, 2009.
U.S. Appl. No. 12/628,437, filed Dec. 1, 2009.
U.S. Appl. No. 12/790,677, filed May 28, 2010.

Yang, J C, et al., "A Real-Time Distributed Light Field Camera," Rendering Techniques 2002, Eurographics Workshop Proceedings, PIS, Italy, Jun. 26-28, 2002, 9 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

M. Levoy, "Light Fields and computational Imaging," Computer [Online], vol. 39, No. 8, Aug. 2006, pp. 46-55, XP002501300.

Levoy M., Hanrahan P.: "Light Field Rendering," ACM Trans. Graph. (1996), 31-42.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

J. Neumann, et al., "Eyes from Eyes Analysis of Camera Design Using Plenoptic Video Geometry," Dec. 2001, 20 pages, XP002509893.

Georgeiv, et al. "Spatio-Angular Resolution Tradeoff in Integral Photography," Proc. EGSR, 2006, 10 pages.

Farsiu, S., Robinson, D., Elad, M., and Milanfar, P., "Advances and challenges in super-resolution," International Journal of Imaging Systems and Technology, 2004, 12 pages.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Elad, M., and Feuer, A., "Restoration of a single superresolution image from several blurred, noisy, and undersampled measured images," IEEE Transactions on Image Processing Dec. 1997, pp. 1646-1658.

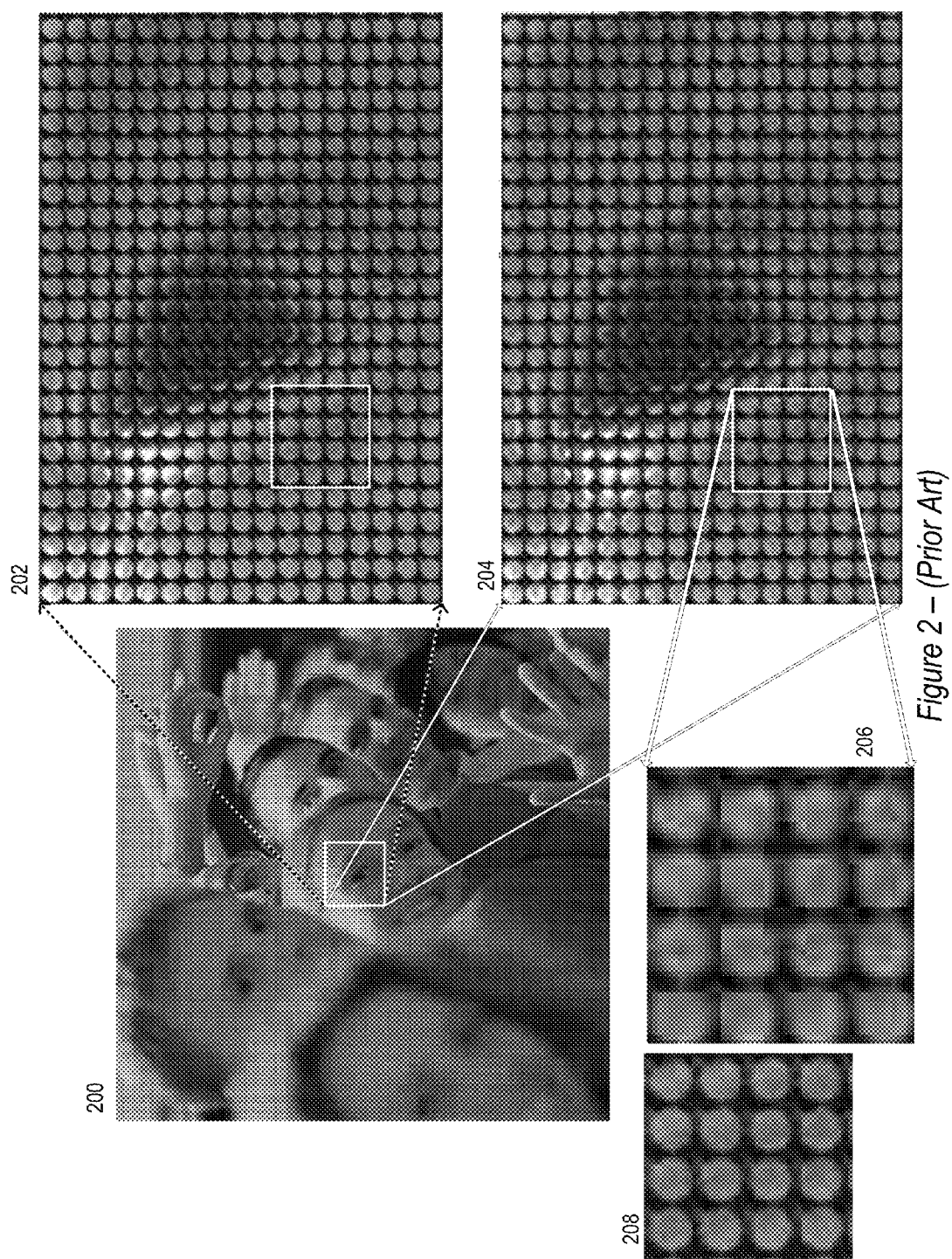
Figure 2 – (Prior Art)

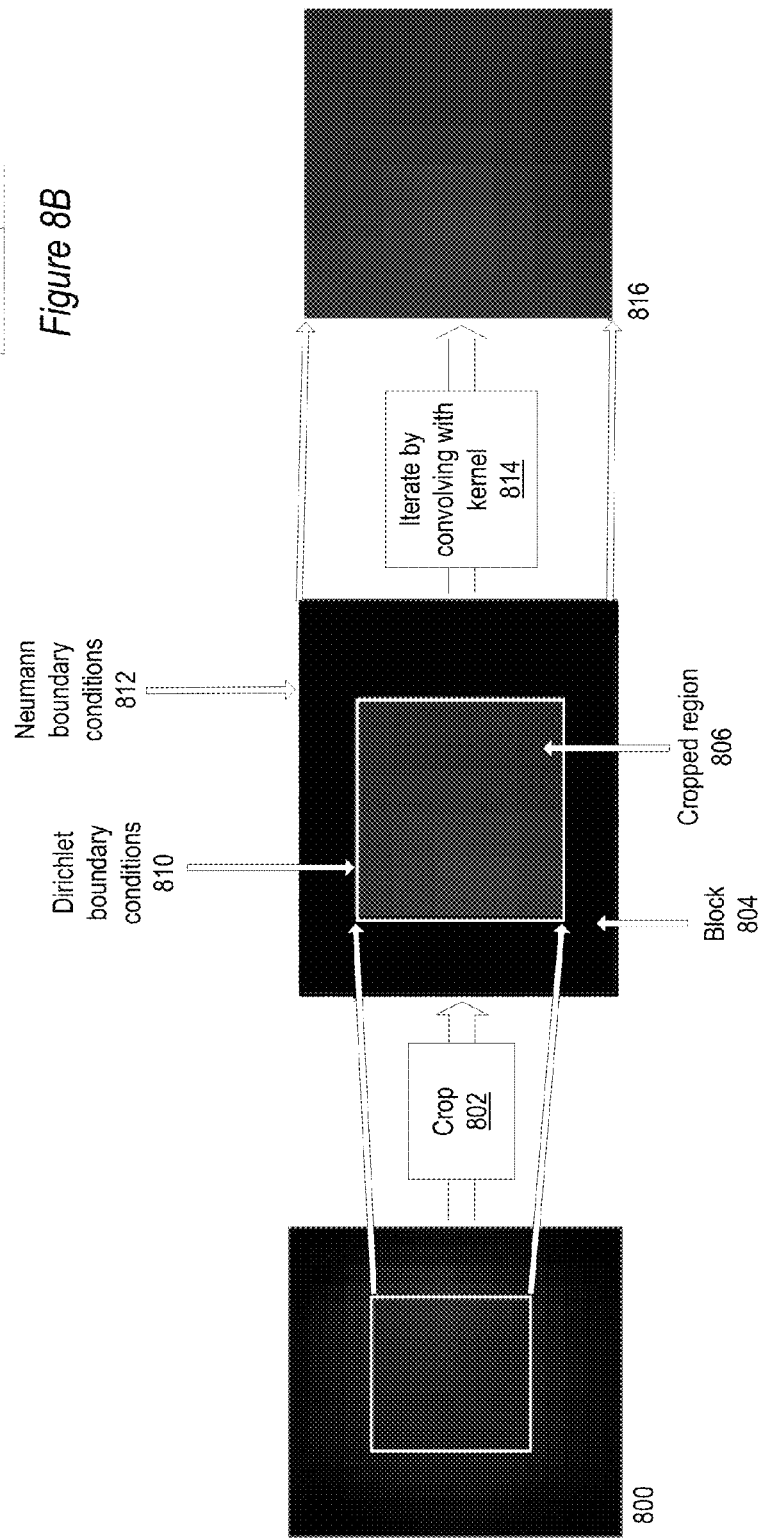

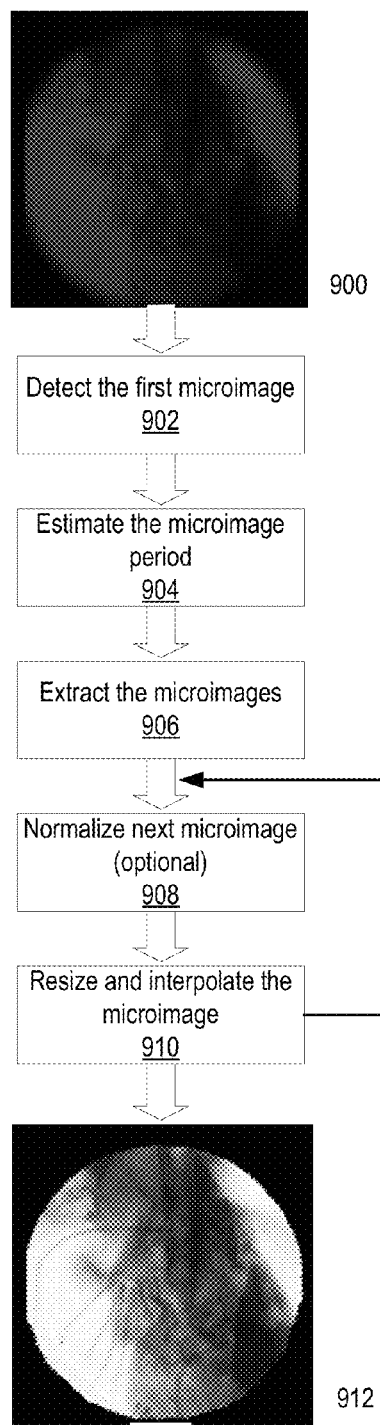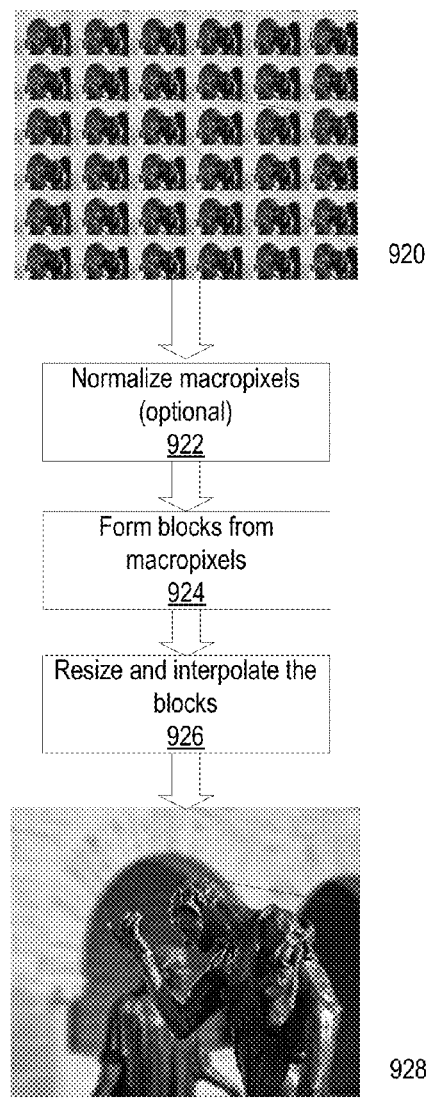
Figure 9A
Figure 9B

METHOD AND APPARATUS FOR BLOCK-BASED COMPRESSION OF LIGHT-FIELD IMAGES

This application is a continuation of U.S. application Ser. No. 12/111,735, filed on Apr. 29, 2008 now U.S. Pat. No. 8,155,456, which is incorporated by reference herein in its entirety.

BACKGROUND

Description of the Related Art

Conventional cameras fail to capture a large amount of optical information. In particular, a conventional camera does not capture information about the location on the aperture where different light rays enter the camera. During operation, a conventional digital camera captures a two-dimensional (2D) image representing a total amount of light that strikes each point on a photosensor within the camera. However, this 2D image contains no information about the directional distribution of the light that strikes the photosensor. Directional information at the pixels corresponds to locational information at the aperture.

In contrast, light-field cameras sample the four-dimensional (4D) optical phase space or light-field and in doing so capture information about the directional distribution of the light rays. This information captured by light-field cameras may be referred to as the light-field, the plenoptic function, or radiance. In computational photography, a light-field is a 4D record of all light rays in 3D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields may be captured with a conventional camera. In one conventional method, M×N images of a scene are captured from different positions with a conventional camera. If, for example, 8×8 images are captured from 64 different positions, 64 images are produced. The pixel from each position (i,j) in each image are taken and placed into blocks, to generate 64 blocks.

FIG. 1A illustrates an exemplary prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 1B illustrates an exemplary prior art plenoptic camera, another type of light-field camera, that employs a single objective lens and a microlens or lenslet array 106 that includes, for example, about 100,000 lenslets. Lenslet array 106 is typically placed a small distance (~0.5 mm) from a photosensor 108, e.g. a charge-coupled device (CCD). The raw image captured with a plenoptic camera 102 is made up of an array of small images, typically circular, of the main camera lens 108. These small images may be referred to as microimages. The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different "pinhole" locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. See, for example, FIG. 2. By appropriately selecting a pixel from each macropixel, a conventional picture of the subject may be created from the microimages of the subject captured at the macropixels.

Captured light-fields from light-field cameras including plenoptic cameras are commonly saved as a 2D image that contains an array of "tiles" or "microimages". Compression of light-field images is an important problem for computational photography. Due to the 4D nature of light-fields, and the fact that 2D slices of light-fields are equivalent to conventional pictures, the uncompressed files tend to be big, and may take up to gigabytes of space. At the same time, there is redundancy in the data: all rays starting from a surface point have approximately the same radiance (exactly the same for Lambertian surfaces). Thus, there is motivation for compression of light-field images.

Conventionally, light-field images have been compressed using existing lossy and lossless image/video compression techniques. Some conventional approaches treat the 2D slices in a light-field image as separate images and compress each separately. In others, the 4D light-field image is contained in one 2D image, which is simply compressed by conventional methods as one image. These approaches do not utilize the information and redundancy specific to light-field images, but rather treat them as general images.

Several approaches have been proposed to compress specifically the light-field images. Some conventional methods treat each 2D slice in the 4D light-field image as a frame in a video. In other words, the 2D angular images in the 4D light-field image are used to create a video, and this video is compressed using a video compression method. However, light-field images compressed with light-field specific compression techniques generally require a special viewer to view the light-field images.

JPEG is a common conventional image compression standard. JPEG stands for Joint Photographic Experts Group, the name of the committee that created the JPEG standard. JPEG is exemplary of block-based compression techniques. JPEG divides images into 8×8 pixel blocks, or more generally block-based compression techniques divide images into m×n pixel blocks, and compresses these blocks using some transform function. Because of the division of images into blocks, JPEG and other block-based compression techniques are known to have the problem of generating "blocking artifacts", in which the compressed image appears to be composed of blocks or has other introduced vertical/horizontal artifacts (e.g., vertical or horizontal lines, discontinuities, or streaks).

The JPEG standard and other block-based compression techniques may be used to compress light-field images directly, without consideration for the specifics of light-field data. However, due to the quasi-periodic nature of light-field images, and the blocky nature of the compression, the results tend to be poor, including noticeable blocking artifacts. Such blocking artifacts may severely damage the angular information in the light-field image, and therefore may limit the horizontal and vertical parallax that can be achieved using these images.

FIG. 2 illustrates a light-field image 200 captured with a plenoptic camera, for example a plenoptic camera 102 as illustrated in FIG. 1B. Expanded region 202 from image 200 illustrates that that the light-field image 200 is composed of many individual macropixels, with each macropixel including a circular microimage. Region 202 shows the captured light-field data without compression. Region 204 shows the light-field data from the same area of image 200 after JPEG compression has been applied to image 200. Blocking artifacts introduced by the JPEG compression are clearly visible, for example in the microimages of the 16 macropixels shown in expanded subregion 206. Image 208 shows the same subregion, uncompressed, for comparison.

However, light-fields compressed with conventional light-field-specific methods, as a rule, cannot be opened and viewed with traditional and more general-purpose image viewers. Users that do not have a light-field viewing application would like to be able to preview simple 2D representations of light-fields with conventional image viewers such as those that can view JPEG-compressed images.

SUMMARY

Various embodiments of a method and apparatus for the block-based compression of light-field images are described. Embodiments may preprocess light-field images into a format that is compatible with the blocking scheme of a block-based compression technique, for example the JPEG compression standard, which is to be used to perform actual compression of the light-field images. Embodiments of a method for the block-based compression of light-field images may be implemented as or in a tool, module, library function, plug-in, stand-alone application, etc. For simplicity, implementations of embodiments may be referred to herein as a light-field preprocessing module.

Embodiments of the light-field preprocessing module may convert captured light-field images into a suitable format so that blocking artifacts of block-based compression (e.g., JPEG) are not introduced in the final compressed image. The light-field preprocessing module reshapes the angular data in a captured light-field image into shapes compatible with the blocking scheme of the block-based compression technique being used (e.g., squares of size 8×8, 16×16, etc. for JPEG) so that the resultant light-field image fits the blocking scheme of the compression technique. For example, if JPEG is used, JPEG block boundaries become natural boundaries of the angular images in the light-field.

Embodiments may produce compressed 2D images for which no specific light-field image viewer is needed to preview the full light-field image. Full light-field information is contained in one 2D image, which may be compressed by a conventional block-based compression technique (e.g., JPEG) in a fast and robust way, and the final compressed image does not contain blocking artifacts that may result if the light-field is compressed without the pre-processing as described herein. In other words, embodiments provide high performance compression with no blocking artifacts in the final compressed light-field.

In embodiments, a captured light-field image is obtained by the light-field preprocessing module. The captured light-field image is preprocessed by the light-field preprocessing module to generate a preprocessed light-field image with a block size and shape that is compatible with the block-based compression technique that is to be used to compress the light-field image. In one embodiment, if a calibration image for the light-field camera is available, a light-field image captured by the camera may be normalized using the calibration image. The preprocessed light-field image is then compressed by a compression engine that implements the block-based compression technique to generate a compressed light-field image. The compressed light-field image may, for example, be stored to a storage medium, such as system memory, a disk drive, DVD, CD, etc. The compressed light-field image may be viewed or otherwise manipulated using any application that is configured to open and view images generated by the block-based compression technique. For example, if JPEG compression is used, the compressed light-field image may be viewed using any application that is capable of opening and displaying JPEG files.

BRIEF DESCRIPTION OF THE DRAWINGS

FIG. 2 illustrates a light-field image captured with a plenoptic camera, for example a plenoptic camera as illustrated in FIG. 1B, and shows blocking artifacts that may result when compressing the raw image with a block-based compression technique.

FIG. 8A illustrates an exemplary interpolation method using Laplacian interpolation according to one embodiment.

FIG. 8B illustrates an exemplary convolution kernel that may be used in embodiments.

FIG. 9A illustrates the preprocessing of light-field images that are captured with light-field imaging systems where microlenses are used behind the main lens, such as the plenoptic camera of FIG. 1B, according to one embodiment.

FIG. 9B illustrates the preprocessing of light-field images that are captured with light-field imaging systems such as the light-field camera of FIG. 1A, according to one embodiment.

Figure 1A:
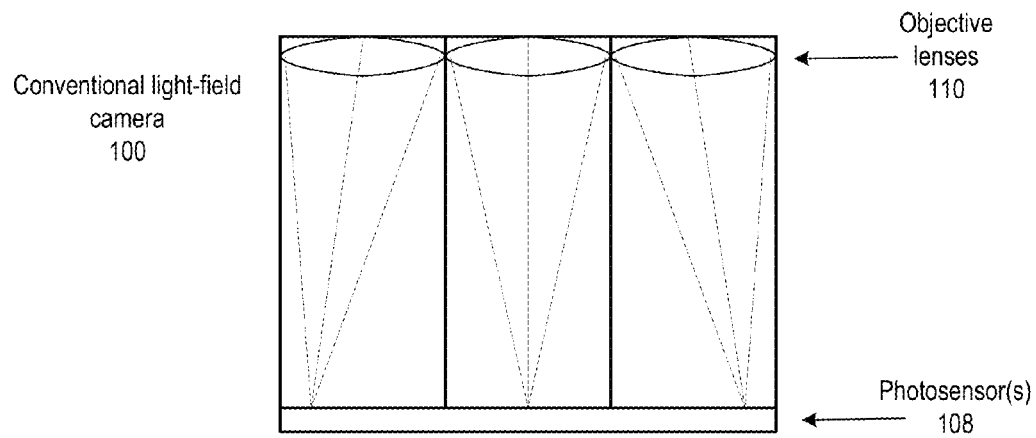
FIG. 1A illustrates an exemplary prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for the block-based compression of light-field images are described. Embodiments may preprocess light-field images into a format that is compatible with the blocking scheme of a block-based compression technique, for example the JPEG compression standard, which is to be used to perform actual compression of the light-field images. Embodiments of a method for the block-based compression of light-field images may be implemented as or in a tool, module, library function, plug-in, stand-alone application, etc. For simplicity, implementations of embodiments may be referred to herein as a light-field preprocessing module.

Embodiments of the light-field preprocessing module may convert captured light-field images into a suitable format so that blocking artifacts of block-based compression (e.g., JPEG) are not introduced in the final compressed image. The light-field preprocessing module reshapes the angular data in a light-field into shapes compatible with the blocking scheme of the block-based compression technique being used (e.g., squares of size 8×8, 16×16, etc. for JPEG) so that the resultant light-field image fits the blocking scheme of the compression technique. For example, if JPEG is used, JPEG block boundaries become natural boundaries of the angular images in the light-field.

Embodiments may produce compressed 2D images for which no specific light-field image viewer is needed to preview the full light-field image. Full light-field information is contained in one 2D image, which is compressed by a conventional block-based compression technique (e.g., JPEG) in a fast and robust way, and the final compressed image does not contain blocking artifacts that may result if the light-field is compressed without the pre-processing as described herein. In other words, embodiments provide high performance compression with no blocking artifacts in the final compressed light-field.

For simplicity, embodiments are generally described herein as using the JPEG compression standard as the block-based compression technique that compresses the preprocessed light-field images generated by embodiments of the light-field preprocessing module. Compressed light-field images generated by embodiments that use the JPEG compression standard are backward compatible with conventional JPEG standards. Embodiments using JPEG compression may achieve good quality compression of light-field images, while also making it possible for the compressed light-fields to be viewed as simple 2D pictures with any application that can open and display JPEG (.jpg) files. When JPEG compression is used, the compressed light-fields may be output as 2D JPEG (.jpg) files, and may thus be viewed with any application that can open and display .jpg files. However, it is to be understood that embodiments are not limited to the JPEG compression standard as the block-based compression technique, but could be applied to any block-based compression technique.

Figure 3A:
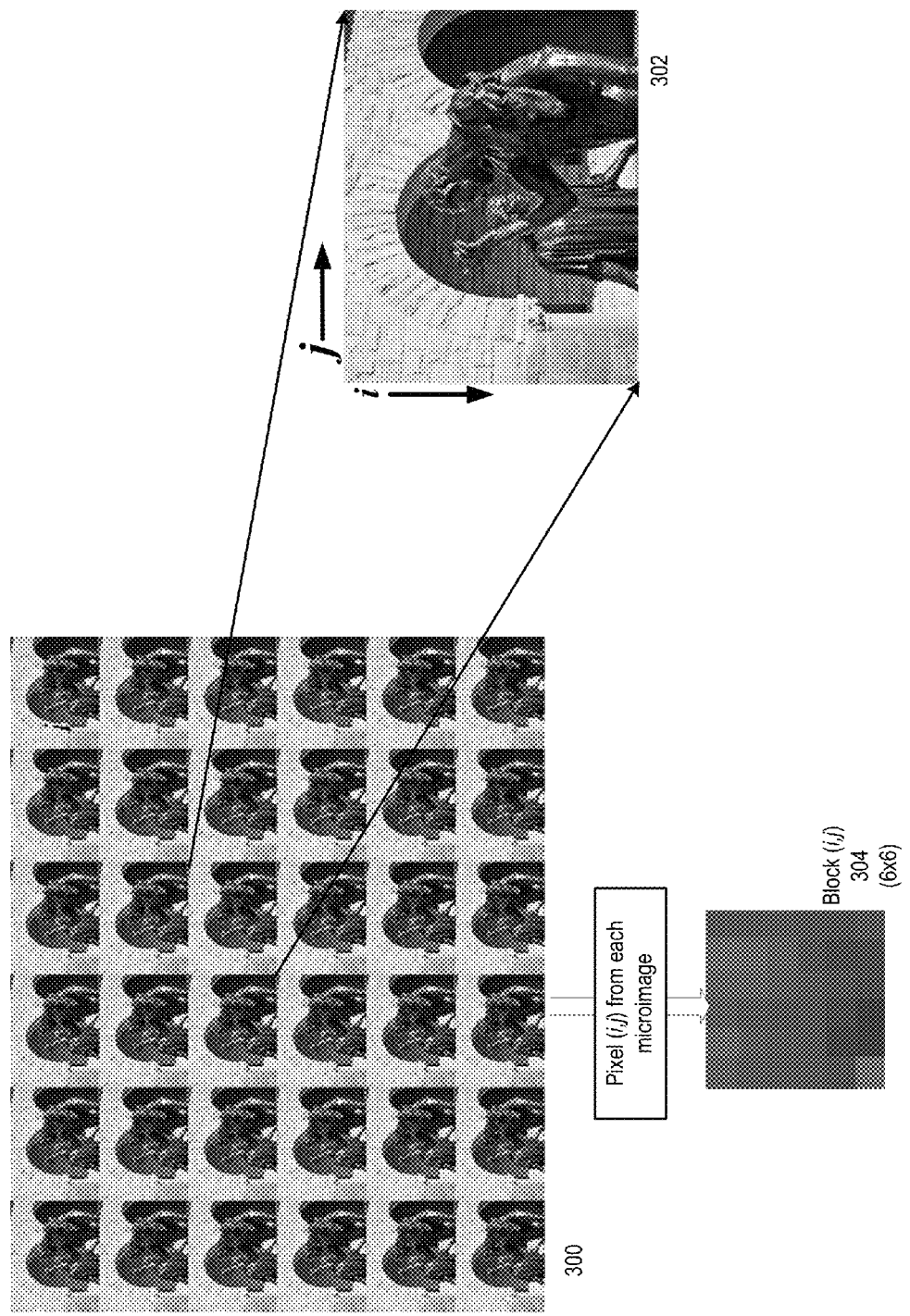
FIGS. 3A and 3B illustrate preprocessing of an exemplary light-field image prior to compression using a block-based compression technique, according to one embodiment.
Figure 3B:

FIGS. 3A and 3B illustrate preprocessing of an exemplary light-field image prior to compression using a block-based compression technique, according to one embodiment. FIG. 3A shows an exemplary 4-D light-field 300 as captured by a light-field camera such as camera 100 of FIG. 1. Note that the 4D light-field 300 is a 2D array of 2D images (views from different centers of projection). These 2D images may be referred to as microimages. Note that the information in each microimage is rectangular. In this example, the array is 6×6, so there are 36 individual images, or microimages, in light-field 300.

Let pixel locations in a given 2D microimage (e.g., microimage 302) be (i,j), where i=1 . . . N and j=1 . . . M, where N is the number of rows of pixels and M is the number of columns of pixels in the 2D microimage. Pixel (i,j) from each of the 36 microimages is taken and put into a block $B_{ij}$ (see block 304). If there are m horizontal images and n vertical images in light-field 300, this block would initially be n×m pixels. In this example, the block would be 6×6 pixels. Furthermore, there are N×M blocks 304. These N×M blocks 304 are to be put into one image, so that all of the angular and spatial information of the light-field is contained in that one image (see image 310 of FIG. 3B). The size in pixels of this resulting image, if the original blocks 304 of dimension n×m are used, would be (N×n)×(M×m).

However, as noted, the block size n×m may not be directly compatible with the blocking scheme of a block-based compression technique such as JPEG. In this example, the block size of 6×6 pixels is not directly compatible with JPEG's typical compression blocking size, which is 8×8 pixels. Therefore, embodiments of the lightfield preprocessing module as described herein may pre-process the blocks 304, as indicated at 306 of FIG. 3B, to produce blocks 308 of a dimension n'×m' that is compatible with the blocking scheme of the block-based compression technique. In this example, the blocks 304 are resized to 8×8 pixels to be compatible with JPEG's blocking scheme. The resized N×M blocks 308 may then be placed into an image 310. The size in pixels of this image 310 is (N×n')×(M×m'). Image 310 may then be compressed with the block-based compression technique without producing blocking artifacts that would result if the blocks 304 of the original, non-compatible dimensions were used in image 310.

In this example, the block size n×m of blocks 304 is 6×6, which is smaller than the block size of the block-based compression technique (8×8). In such cases, the pixel information in the original blocks 304 or regions may be interpolated to fill the pixel values in the new, larger blocks 308. Any of various interpolation techniques may be used. In one embodiment, for example, Laplacian interpolation may be used.

It could also be the case in some light-field images that n×m (the default or "raw" block size) is larger than the block size used by the block-based compression technique. Furthermore, n is not necessarily equal to m. For example, n×m may be 11×14, or 11×11, or 9×9, or 8×10, or 21×21, and so on. In some block-based compression techniques, such as JPEG, the blocking scheme may allow for multiples of a base blocking size. For example, JPEG may allow for block sizes that are multiples of 8, such as 8×8, 16×16, 32×32, and so on. Thus, in one embodiment, a next larger block size provided by the block-based compression technique may be used for the block size of blocks 308. For example, if n×m is 12×14, and the block-based compression technique allows for 8×8 or 16×16 block sizes, 16×16 may be used for size n'×m' of blocks 308.

Alternatively, blocks 306 may simply be cropped to produce smaller blocks 308 if n'×m' is smaller than n×m. For example, if n×m is 10×10, and n'×m' is 8×8, blocks 306 may simply be cropped to 8×8. Note that, in some light-field images, the edge information in the microimages may be noisy in any case due to the nature of the light-field camera used to capture the light-field information, so cropping edge pixels may be performed without losing much usable light-field information. Note also that the larger the microimage in pixels, the less negative effect (loss of light-field information) will result from cropping. Thus, cropping may not be used on microimages that include a limited number of pixels, where the light-field information in each pixel is relatively more valuable than that in each pixel of a microimage with more pixels.

The above describes a process whereby the blocks 304 are resized by the light-field preprocessing module into blocks 308 that are sized in accordance with the blocking scheme of the block-based compression technique before being placed into image 310. Alternatively, an image may be formed from blocks 304 of the original dimension (n×m), and then the light-field preprocessing module may iterate through the blocks 304 in the image, resizing each block to form a new image 310 composed of blocks 308 sized in accordance with the blocking scheme of the block-based compression technique.

Figure 4:
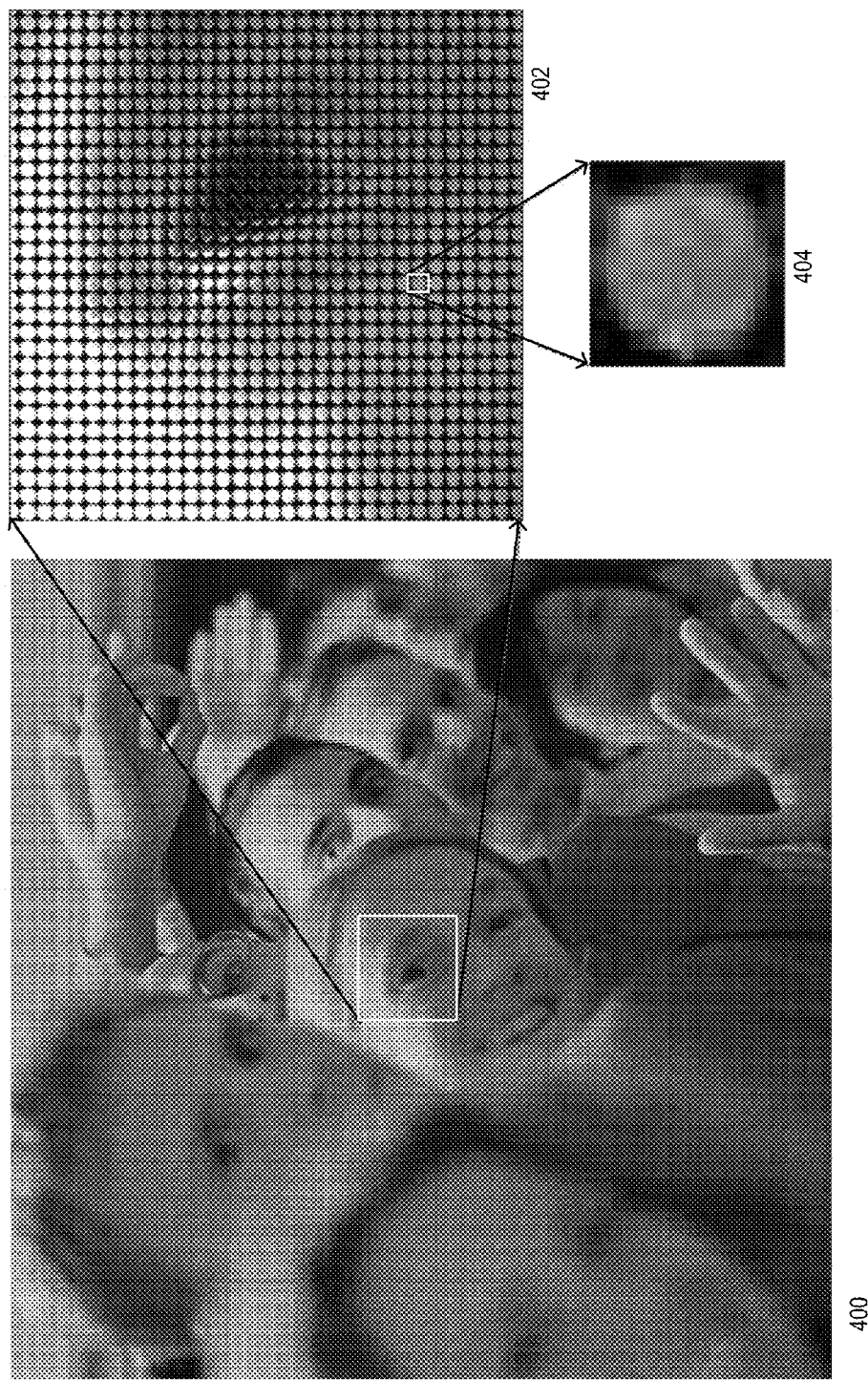
FIG. 4 illustrates an exemplary light-field image captured with a plenoptic camera, for example a plenoptic camera as illustrated in FIG. 1B.

In some light-field images, rather than each microimage being a rectangle as illustrated in FIGS. 3A and 3B, the recorded information is a circle or disk representing the camera aperture (referred to as a microimage) in each block or macropixel. FIG. 4 illustrates an exemplary light-field image 400 captured with a plenoptic camera, for example a plenoptic camera 102 as illustrated in FIG. 1B. Region 402 shows an expanded region of light-field image 400, and macropixel 404 from the expanded region 402 shows an exemplary circular microimage. In one embodiment, rather than simply resizing each macropixel 404 as in the case with image 300 of FIG. 3A, the light-field preprocessing module first reshapes the circular microimage to a rectangular area or block, for example by cropping, and then resizes the resultant block to be compatible with the blocking scheme of the block-based compression technique (e.g., to an 8×8 block for JPEG compression). Pixel information in the block may be interpolated to generate pixel values in the new block, if necessary. Different methods may be applied to make the block of a size that is compatible with the blocking scheme of the block-based compression technique. For example, assume JPEG compression is being used. If the cropped area from the microimage (the block) is smaller than 8×8, the block is resized to 8×8, with interpolation used to generate the pixel values. If the block is larger than 8×8 but smaller than 16×16, the block may either be resized down to 8×8, for example by cropping, or resized to 16×16, with interpolation used to generate the pixel values.

Once the microimages are cropped, and the cropped blocks are resized into blocks of a size that is compatible with the blocking scheme of the block-based compression technique, the resized blocks may be placed into an image similar to image 310 of FIG. 3B. The angular and spatial information of the light-field is contained in the resultant image. The resultant image may then be compressed using the block-based compression technique without generating blocking artifacts, as the block size of the resultant image is the same as the block size used in the blocking scheme of the block-based compression technique.

Figure 5:
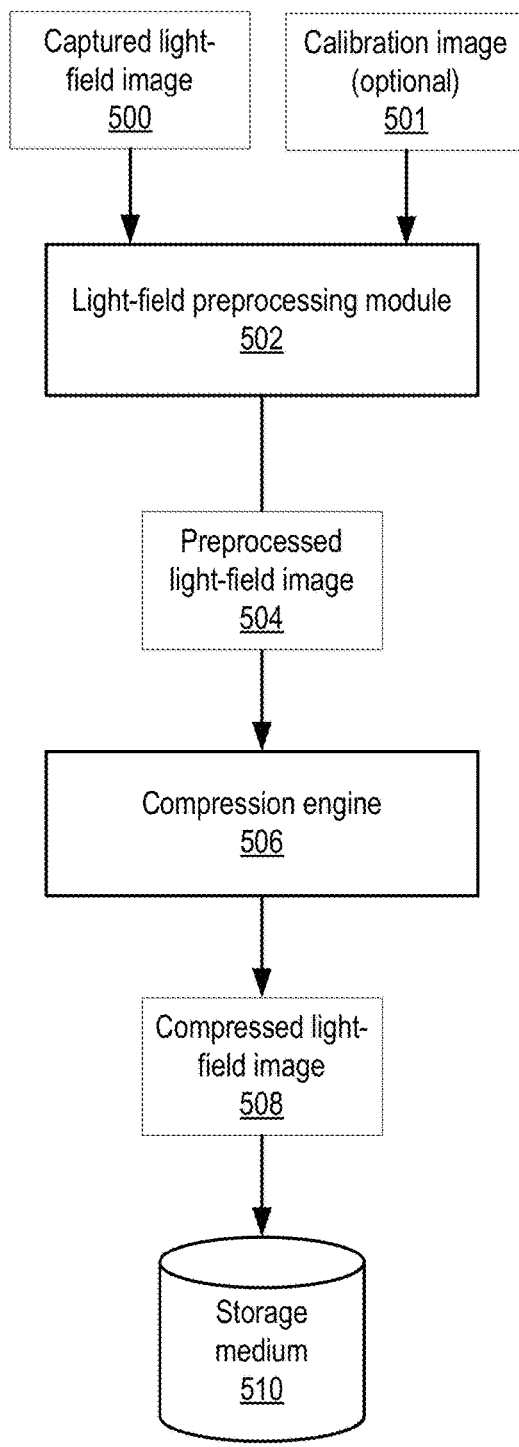
FIG. 5 is a high-level block diagram that shows data flow in a light-field preprocessing and compression method, according to one embodiment.

FIG. 5 is a high-level block diagram that shows data flow in a light-field preprocessing and compression method, according to one embodiment. A captured light-field image 500 (e.g., image 300 of FIG. 3A or image 400 of FIG. 4) is obtained by the light-field preprocessing module 502. Image 500 is preprocessed by the light-field preprocessing module 502 to generate a preprocessed light-field image 504 with a block size that is compatible with the block-based compression technique that is to be used to compress image 504. In one embodiment, if a calibration image 501 for the light-field camera is available, a light-field image 500 captured by the camera may be normalized using the calibration image. The captured light-field image is typically divided by the calibration image to normalize the image. Image 504 is then compressed by a compression engine 506 that implements the block-based compression technique to generate a compressed light-field image 508. Compressed image 508 may, for example, be stored to a storage medium 510, such as system memory, a disk drive, DVD, CD, etc. Compressed light-field image 508 may be viewed or otherwise manipulated using any application that is configured to open and view images generated by the block-based compression technique. For example, if JPEG compression is used, image 508 may be viewed using any application that is capable of opening and displaying JPEG files.

Figure 10:
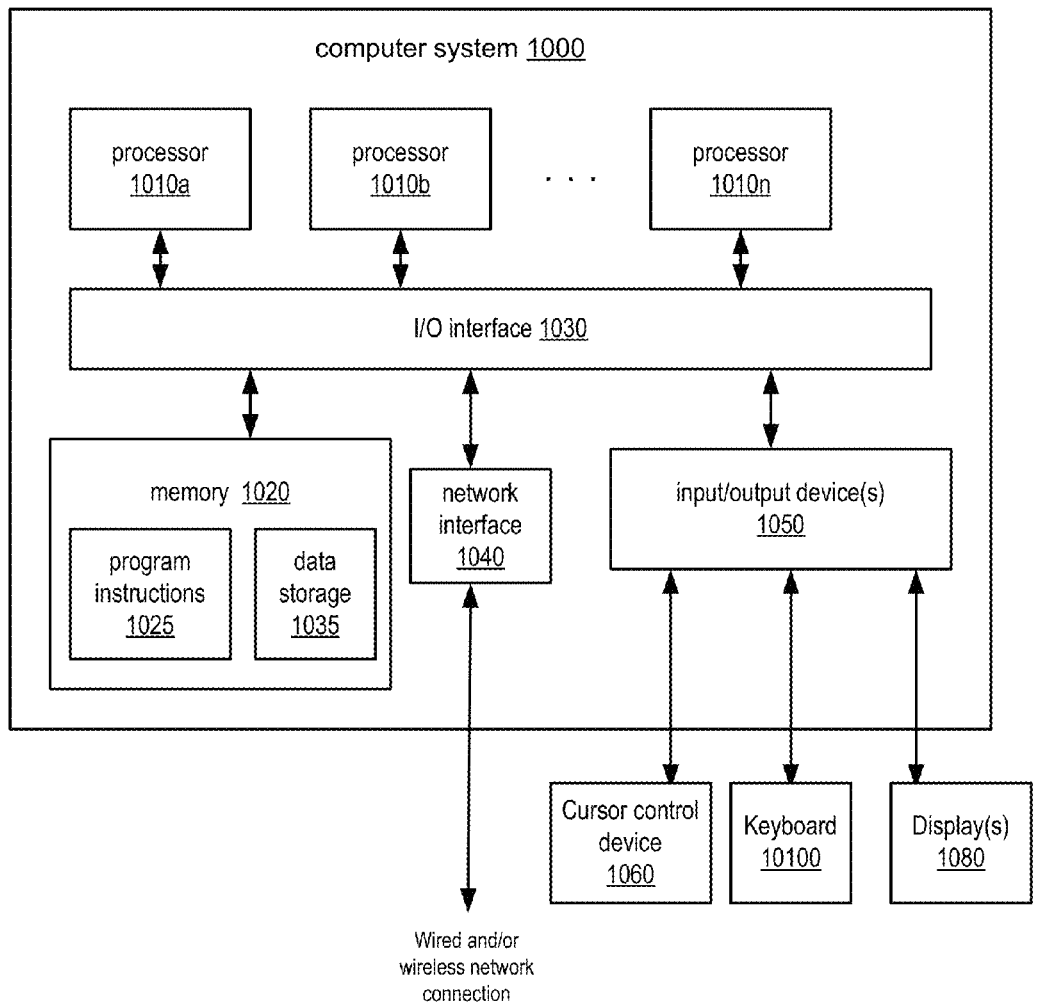
FIG. 10 illustrates an exemplary computer system that may be used in embodiments.

Embodiments of a light-field preprocessing module 502 and a compression engine 506 may be implemented on a computer system. An exemplary system on which embodiments may be implemented is illustrated in FIG. 10. Light-field preprocessing module 502 may be implemented as or in a tool, module, library function, plug-in, stand-alone application, etc. Light-field preprocessing module 502 may provide a user interface that provides one or more textual and/or graphical user interface elements, modes or techniques via which a user may control various aspects of the preprocessing of light-field images. For example, the user interface may include user interface elements that allow a user to select input and output files, to specify the compression technique to be used, to specify the block size for the preprocessed image 504, to specify whether the blocks are to be scaled up (interpolated) or down (cropped), and so on.

FIGS. 6 through 9 illustrate in more detail embodiments of a method for the preprocessing of light-field images prior to block-based compression of the images, specifically as applied to images such as image 400 of FIG. 4 in which each macropixel includes a circular microimage. Note, however, that at least some of the preprocessing illustrated in and described for these Figures may also be applied in the preprocessing of images such as image 300 of FIG. 3A in which each macropixel is a rectangular microimage. These Figures assume by way of example that the block-based compression is to be performed according to the JPEG compression standard, and that that the block size of the blocking scheme used in the JPEG compression is 8×8 pixels. These Figures also assume by way of example that a portion of the microimage is to be extracted and scaled or interpolated to fit a larger block, and that a Laplacian interpolation technique is to be employed. In various embodiments, other block-based compression techniques than JPEG may be used, other block sizes than 8×8 pixels may be used, and other methods of scaling up including other interpolation techniques may be used. Note that, in one embodiment, scaling down to fit a smaller block size may be performed by simply cropping the input microimages.

Figure 6:
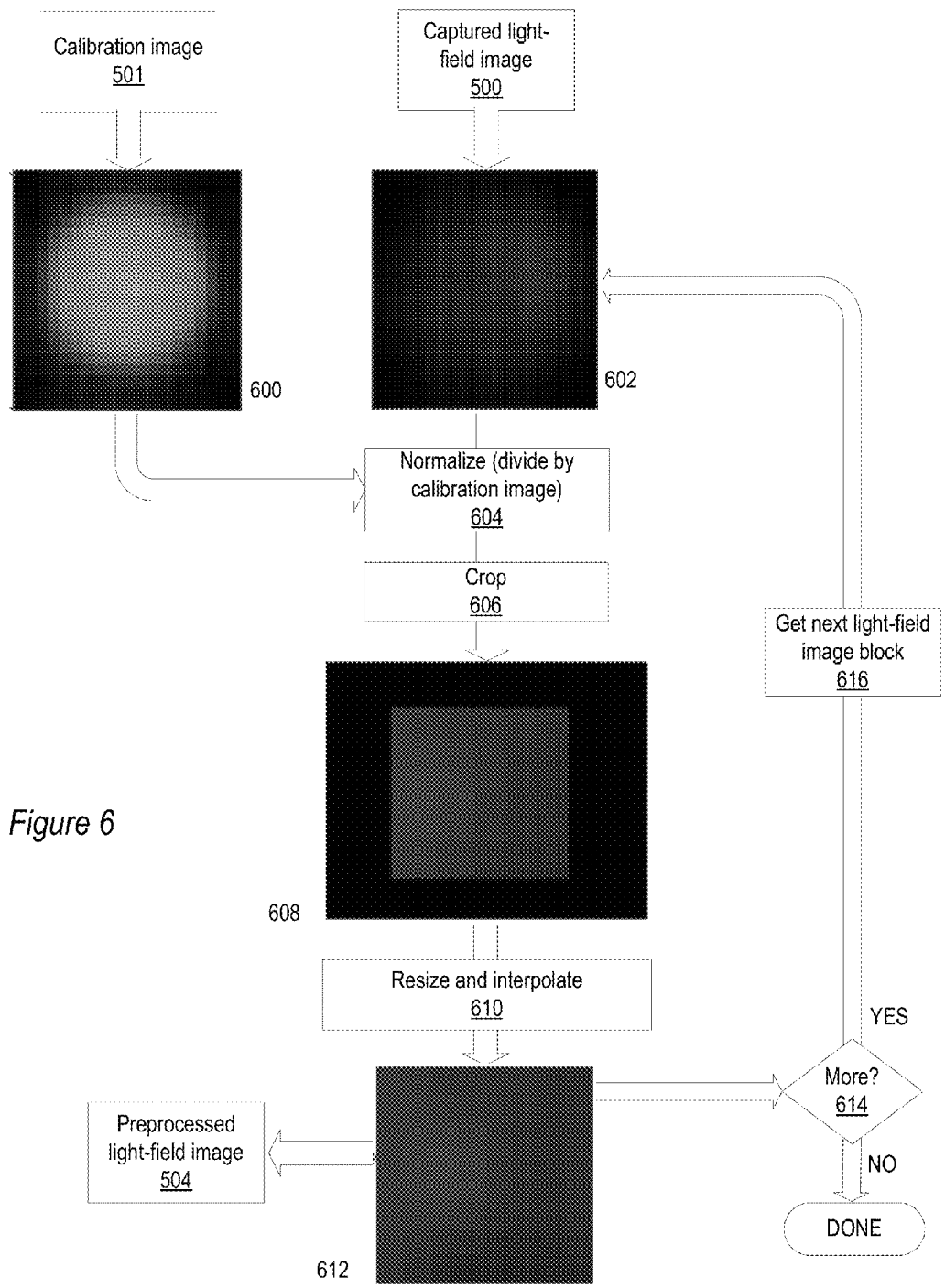
FIG. 6 is a flowchart of a method for the preprocessing of macropixels or blocks from a light-field image prior to block-based compression of the light-field image, according to one embodiment.

FIG. 6 is a flowchart of a method for the preprocessing of macropixels or blocks from a light-field image prior to block-based compression of the light-field image, according to one embodiment. The method illustrated in FIG. 6 may be implemented in a light-field preprocessing module such as module 502 of FIG. 5.

The light-field preprocessing module 502 may obtain a first light-field image block 602, or macropixel, from the light-field image 500 to be preprocessed. In this example, the exemplary block 602 is approximately 20×20 pixels. Embodiments of the light-field preprocessing module, however, may be configured to work with light-field image blocks 602 of various sizes, and the blocks 602 are not necessarily square, or even necessarily rectangular, as embodiments of the preprocessing method will work with input blocks of other shapes, such as hexagonal shapes. In this example, light-field information from the microimage in block 602, which is rectangular and approximately 20×20 pixels, needs to be fit into an 8×8 pixel block for compression using a block-based compression technique, e.g. JPEG.

In one embodiment, if a calibration image 501 for the light-field camera is available, a light-field image 500 captured by the camera may be normalized using the calibration image. The captured light-field image is typically divided by the calibration image to normalize the image. Thus, in one embodiment, the light-field image block 602 may be normalized by dividing the block 602 by a corresponding calibration block 600 from a calibration image 501 captured with the light-field camera, as indicated at 604. In preprocessing captured light-field image 500, each block 602 in image 502 may be normalized by dividing the captured light-field block 602 by a corresponding calibration block 600 from the calibration image 501. In one embodiment, rather than normalizing the entire block 602, only a region encompassing the circular microimage may be normalized.

Figure 7:
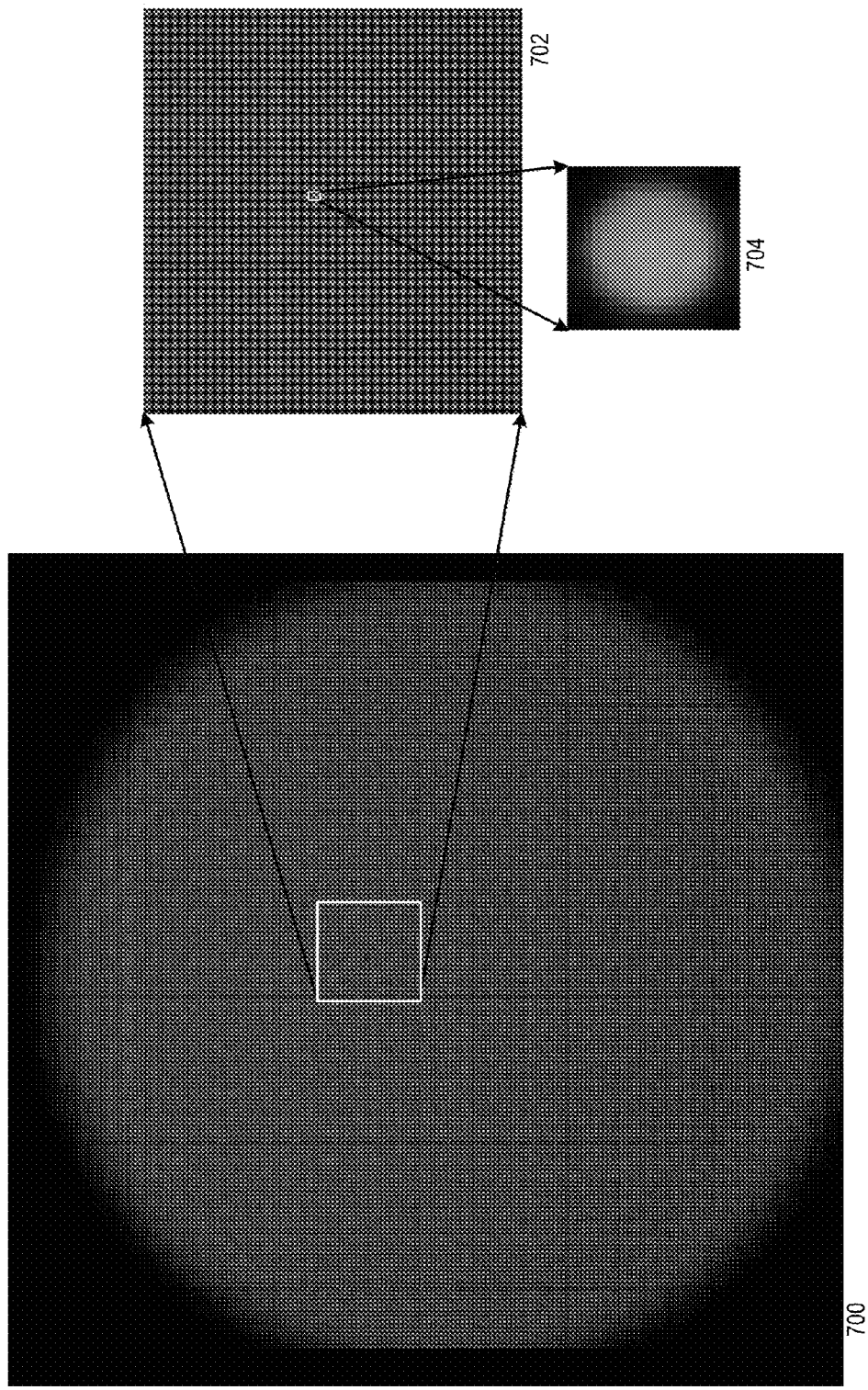
FIG. 7 illustrates an exemplary calibration image for a plenoptic light-field camera.

FIG. 7 illustrates an exemplary calibration image for a plenoptic light-field camera. The calibration image 700 is an image of an all-white scene taken by the light-field camera, in this example by a plenoptic camera such as camera 102 of FIG. 1B. Referring to camera 102, the large circle in calibration image 700 corresponds to the aperture of the objective lens 104, and each small circle or microimage within the large circle corresponds to the aperture of a particular one of the microlenses or lenslets within microlens array 106. The normalization procedure may improve the quality at the boundary of each microlens aperture circle, and enhances the overall appearance of the light-field image, removing color bias that may be introduced by the light-field apparatus (the camera). The color bias is at the edges of the microimages, and is due to attenuation of the microlenses at the boundaries. Region 702 shows an exemplary expanded region from calibration image 700, and macropixel 704 shows an exemplary expanded macropixel or block from region 702 and its circular microimage.

After normalization, if performed, the block 602 is reshaped so that a rectangular area of light-field information is obtained. In some light-field images 500, such as those captured by a plenoptic camera 102 as illustrated in FIG. 1B, the recorded light-field information is a disk or circle (representing camera aperture) in each block 602, referred to as a microimage. This circular light-field information needs to be reshaped to a rectangular area of a size that is compatible with the blocking scheme of the block-based compression technique. In one embodiment, this may be accomplished by cropping the microimage in block 602 to obtain a smaller block, as indicated at 606. In this example, cropping 606 results in a 5×5 block 608 of light-field information. At 610, the cropped block 608 is then resized to the block size to be used by the compression technique, in this example 8×8, and an interpolation technique is applied to fill in the pixel values in the 8×8 block, to generate resized block 612. In one embodiment, a Laplacian interpolation technique may be used in which the Laplace equation is solved to determine the pixel values. The resized block 612 is created in or placed into a corresponding location of a preprocessed light-field image 504. At 614, if there are more light-field image blocks to be preprocessed, the method obtains a next image block 602 from captured light-field image 500 and continues. Otherwise, the preprocessing of the light-field image 500 is done. Referring to FIG. 5, the preprocessing of the captured light-field image 500 by light-field preprocessing module 502 is done, and a preprocessed light-field image 504 is output for compression by compression engine 506.

Referring again to FIG. 6, the size of the cropped block 608 may be different than 5×5, which is used by way of example, and the resizing process may be different depending on the crop size used. For example, assume JPEG compression is being used. If the cropped area from the microimage (e.g., block 608) is smaller than 8×8, the block may be resized to 8×8, with interpolation used to generate the pixel values. If the block 608 is larger than 8×8 but smaller than 16×16, the block may either be resized down to 8×8 or resized up to 16×16, with interpolation used to generate the pixel values.

In one embodiment, the interpolation technique used by the light-field preprocessing module 502 may be a Laplace solver. FIGS. 8A and 8B illustrate an exemplary interpolation method using Laplacian interpolation according to one embodiment. The goal of interpolation is to populate the black region between region 806, which was cropped, at 802, from macropixel 800, and the outer boundary of block 804 using the pixel values inside the cropped region 806. In this example, region 806 is a 5×5 pixel square, and block 804 is an 8×8 pixel square, but note that either or both may be of different shapes or dimensions. One embodiment may use Dirichlet boundary conditions 810 at the boundaries of the cropped region 806, and Neuman boundary conditions 812 at the boundaries of the block 804. It is well known that solving the Laplace equation with these boundary conditions may be achieved by iterating over this block by convolving with an appropriate kernel, as indicated at 814, to generate an output block 816 (in this example, an 8×8 output block). FIG. 8B illustrates an exemplary convolution kernel that may be used in embodiments. In this embodiment, convolution starts from the boundaries of the cropped region 806, thus filling the black regions by propagating information from inside out. Generally, approximately three to four iterations are enough to fill the entire block 804.

FIGS. 9A and 9B illustrate the preprocessing of light-field images according to one embodiment. FIG. 9A illustrates the preprocessing of light-field images, such as exemplary image 400 in FIG. 4, that are captured with light-field imaging systems where microlenses are used behind the main lens, such as plenoptic camera 102 of FIG. 1B, according to one embodiment. FIG. 9B illustrates the preprocessing of light-field images, such as exemplary image 300 in FIG. 3, that are captured with light-field imaging systems such as light-field camera 100 of FIG. 1A, according to one embodiment. Embodiments of the light-field preprocessing module may be configured to preprocess one or both types of light-field images.

Referring to FIG. 9A, elements 902, 904, and 906 may be performed by the light-field preprocessing module in preprocessing light-field images, such as exemplary image 400 in FIG. 4, that are captured with light-field imaging systems where microlenses are used behind the main lens, such as plenoptic camera 102 of FIG. 1B. These elements may be performed to detect and extract the individual microlens images from a light-field image 900 captured with a light-field imaging system such as plenoptic camera 102 of FIG. 1B. Exemplary light-field image 900 is a 2D image consisting of multiple microlens images. Each microlens image is the image of the aperture of the main (objective) lens seen from a different angle. In one embodiment, a microimage detection method may be used by the light-field preprocessing module to extract the individual microlens images (microimages) from light-field image 900. In the microimage detection method, the light-field preprocessing module detects the first microimage, as indicated at 902, and then estimates the period of the microimages, as indicated at 904. In one embodiment, this may be done by taking the average of the pixel values in vertical and horizontal directions, then taking the autocorrelation of these average values, and finally looking at the distances of the first peak from the zero shift in the autocorrelations. These values give the approximate vertical and horizontal distances between microimages. The light-field preprocessing module then takes the coordinates of the microimages at the top-left corner, and then by iterating in the image, extracts each microimage, as indicated at 906. The size of the microlens blocks (i.e., macropixels) is set to half of the period of the microimages. Then, for each extracted microimage, normalization may be optionally performed, as indicated at 908, and resizing and, if necessary, interpolation is performed, as indicated at 910, to generate a preprocessed light-field image 912.

In one embodiment, rather than iterating the image 900 and extracting all microimages and then preprocessing the extracted microimages as indicated at 908 and 910, the light-field preprocessing module may be configured to extract a next microimage, preprocess the extracted microimage as indicated at 908 and 910, and repeat the extraction and preprocessing for each microimage until all microimages in image 900 are extracted and preprocessed.

Figure 1B:
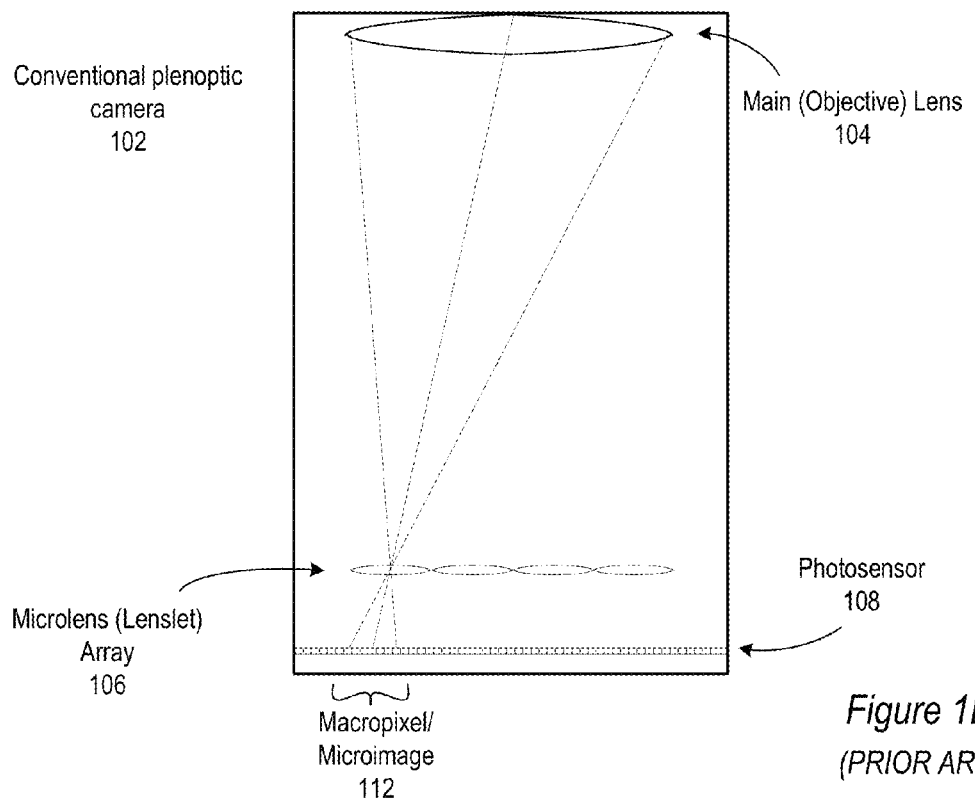
FIG. 1B illustrates an exemplary prior art plenoptic camera that employs a single objective lens and a microlens array.

FIG. 9B illustrates the preprocessing of light-field images, such as exemplary image 300 in FIG. 3, that are captured with light-field imaging systems such as light-field camera 100 of FIG. 1A, according to one embodiment. In these images, there are no circular microimages in each macropixel of the input captured light-field image 920. Essentially, each macropixel in the captured light-field image 920 is a microimage. For these types of images, normalization of the macropixel may be optionally performed, as indicated at 922. Blocks of n×m pixels are formed from the macropixels, as indicated at 924, for example as described in reference to FIGS. 3A and 3B. Resizing and, if necessary, interpolation is performed on the blocks, as indicated at 926, to generate blocks of n'×m' pixels compatible with the blocking scheme of the block-based compression technique. All of the blocks extracted from the image 920 are processed thusly to generate a preprocessed light-field image 928.

Preprocessed light-field image 912 of FIG. 9A and preprocessed light-field image 928 of FIG. 9B may then be compressed using a block-based compression technique, such as JPEG compression. Since the preprocessing performed by the light-field preprocessing module has resized the blocks in the preprocessed light-field images to a size (and shape) that is compatible with the blocking scheme used by the compression technique, the resultant compressed images would not have blocking artifacts, as they would if they were directly compressed without preprocessing as described herein.

Exemplary System

Various embodiments of a light-field preprocessing module may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the preprocessing of light-field images for compression with a block-based compression technique, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a light-field preprocessing module, and data storage 1035, comprising various data accessible by program instructions 1025. In one embodiment, program instructions 1025 may include software elements of a light-field preprocessing module and a block-based compression engine as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of embodiments of a light-field preprocessing module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
processing, by one or more computing devices, a light-field image to generate a processed light-field image, wherein the light-field image comprises a plurality of microimages, wherein dimensions of the microimages are different than blocking dimensions used by an image processing technique, and wherein said processing comprises:
estimating a microimage period for the light field image, wherein the microimage period indicates vertical and horizontal distances between the microimages in the light field image;
locating each microimage in the light field image according to the microimage period;
at each located microimage, extracting a microimage block from the light field image according to the microimage period;
resizing each extracted microimage block according to the blocking dimensions; and
storing each resized microimage block to a respective location in the processed light-field image according to the blocking dimensions.

2. The method as recited in claim 1, wherein the light-field image is captured with a plenoptic camera comprising an objective lens, a photosensor, and a microlens array comprising a plurality of microlenses located between the objective lens and the photosensor, wherein the plurality of microimages each correspond to one of the plurality of microlenses in the microlens array.

3. The method as recited in claim 1, wherein extracting a microimage block from the light field image according to the microimage period comprises cropping the respective located microimage to generate the microimage block, wherein vertical and horizontal dimensions of the microimage block are less than the vertical and horizontal dimensions of the microimage period.

4. The method as recited in claim 1, further comprising normalizing each microimage according to a corresponding region of a calibration image prior to said resizing.

5. The method as recited in claim 1, further comprising applying an interpolation technique to each resized microimage block.

6. The method as recited in claim 1, wherein said estimating a microimage period for the light field image comprises:
determining an average of pixel values in vertical and horizontal directions in the light-field image;
determining an autocorrelation of the average pixel values in the vertical and horizontal directions; and determining the vertical and the horizontal distances between the microimages in the light field image according to the autocorrelations.

7. The method as recited in claim 1, wherein the image processing technique is a block-based compression technique, and wherein the method further comprises compressing the processed light-field image in accordance with the block-based compression technique to generate a compressed light-field image.

8. The method as recited in claim 7, wherein the block-based compression technique compresses the preprocessed light-field image in accordance with the JPEG (Joint Photographic Experts Group) compression standard.

9. The method as recited in claim 7, wherein the compressed light-field image is viewable using any application that is capable of accessing files compressed using the block-based compression technique.

10. The method as recited in claim 1, wherein the dimensions of the blocks in the processed light-field image are eight pixels by eight pixels.

11. The method as recited in claim 1, further comprising, prior to said processing the light-field image to generate a processed light-field image, normalizing the light-field image in accordance with a calibration image.

12. A system, comprising:
one or more processors; and
a memory comprising program instructions, wherein the program instructions are executable by at least one of the one or more processors to process a light-field image to generate a processed light-field image, wherein the light-field image comprises a plurality of microimages, wherein dimensions of the microimages are different than blocking dimensions used by an image processing technique, wherein, to process the light-field image, the program instructions are executable by at least one of the one or more processors to:
  estimate a microimage period for the light field image, wherein the microimage period indicates vertical and horizontal distances between the microimages in the light field image;
  locate each microimage in the light field image according to the microimage period;
  at each located microimage, extract a microimage block from the light field image according to the microimage period;
  resize each extracted microimage block according to the blocking dimensions; and
  store each resized microimage block to a respective location in the processed light-field image according to the blocking dimensions.

13. The system as recited in claim 12, wherein, to extract a microimage block from the light field image according to the microimage period, the program instructions are executable by at least one of the one or more processors to crop the respective located microimage to generate the microimage block, wherein vertical and horizontal dimensions of the microimage block are less than the vertical and horizontal dimensions of the microimage period.

14. The system as recited in claim 12, wherein the program instructions are executable by at least one of the one or more processors to normalize each microimage according to a corresponding region of a calibration image prior to said resizing.

15. The system as recited in claim 12, wherein, to estimate a microimage period for the light field image, the program instructions are executable by at least one of the one or more processors to:

determine an average of pixel values in vertical and horizontal directions in the light-field image;
determine an autocorrelation of the average pixel values in the vertical and horizontal directions; and
determine the vertical and the horizontal distances between the microimages in the light field image according to the autocorrelations.

16. The system as recited in claim 12, wherein the image processing technique is a block-based compression technique, and wherein the program instructions are executable by at least one of the one or more processors to compress the processed light-field image in accordance with the block-based compression technique to generate a compressed light-field image.

17. A non-transitory computer-readable storage medium storing program instructions, wherein the program instructions are computer-executable to implement:
processing a light-field image to generate a processed light-field image, wherein the light-field image comprises a plurality of microimages, wherein dimensions of the microimages are different than blocking dimensions used by an image processing technique, and wherein, in said processing the light-field image, the program instructions are computer-executable to implement:
  estimating a microimage period for the light field image, wherein the microimage period indicates vertical and horizontal distances between the microimages in the light field image;
  locating each microimage in the light field image according to the microimage period;
  at each located microimage, extracting a microimage block from the light field image according to the microimage period;
  resizing each extracted microimage block according to the blocking dimensions; and
  storing each resized microimage block to a respective location in the processed light-field image according to the blocking dimensions.

18. The non-transitory computer-readable storage medium as recited in claim 17, wherein, in said extracting a microimage block from the light field image according to the microimage period, the program instructions are computer-executable to implement cropping the respective located microimage to generate the microimage block, wherein vertical and horizontal dimensions of the microimage block are less than the vertical and horizontal dimensions of the microimage period.

19. The non-transitory computer-readable storage medium as recited in claim 17, wherein, in said estimating a microimage period for the light field image, the program instructions are computer-executable to implement:
determining an average of pixel values in vertical and horizontal directions in the light-field image;
determining an autocorrelation of the average pixel values in the vertical and horizontal directions; and
determining the vertical and the horizontal distances between the microimages in the light field image according to the autocorrelations.

20. The non-transitory computer-readable storage medium as recited in claim 17, wherein the image processing technique is a block-based compression technique, and wherein the program instructions are computer-executable to implement compressing the processed light-field image in accordance with the block-based compression technique to generate a compressed light-field image.

* * * * *